United States Patent [19]

Ueda et al.

[11] Patent Number: 4,955,998
[45] Date of Patent: Sep. 11, 1990

[54] PROCESS FOR SEPARATING GAS

[75] Inventors: Kanji Ueda, Ashiya; Kazuo Haruna, Kakogawa; Masahiro Inoue, Shikama, all of Japan

[73] Assignee: Sumitomo Seika Chemicals Co., Ltd., Miyanishi, Japan

[21] Appl. No.: 424,933

[22] Filed: Oct. 20, 1989

Related U.S. Application Data

[63] Continuation-in-part of Ser. No. 233,600, Aug. 18, 1988, abandoned.

[30] Foreign Application Priority Data

Aug. 21, 1987 [JP] Japan ................................ 62-208500

[51] Int. Cl.$^5$ ............................................. B01D 53/22
[52] U.S. Cl. ............................................. 55/16; 55/68
[58] Field of Search ....................... 55/16, 68, 158, 25, 55/26, 59, 62

[56] References Cited

U.S. PATENT DOCUMENTS

| | | | |
|---|---|---|---|
| 2,540,151 | 2/1951 | Weller et al. | 55/16 |
| 2,964,124 | 12/1960 | Peierls et al. | 55/16 |
| 3,369,343 | 2/1968 | Robb | 55/16 |
| 3,818,679 | 6/1974 | Klass | 55/16 |
| 4,264,338 | 4/1981 | Null | 55/16 |
| 4,349,356 | 9/1982 | Wakao | 55/16 |
| 4,508,548 | 4/1985 | Manatt | 55/16 X |

FOREIGN PATENT DOCUMENTS

| | | | |
|---|---|---|---|
| 625947 | 8/1961 | Canada | 55/16 |
| 0051469 | 5/1982 | European Pat. Off. | 55/16 |
| 0099868 | 2/1984 | European Pat. Off. | 55/16 |
| 0305120 | 3/1989 | European Pat. Off. | 55/16 |
| 2411024 | 7/1979 | France . | |
| 58-055310 | 4/1983 | Japan . | |
| 59-082903 | 5/1984 | Japan . | |
| 59-203705 | 11/1984 | Japan . | |
| 62-030524 | 2/1987 | Japan . | |
| 62-074405 | 4/1987 | Japan . | |
| 62-074433 | 4/1987 | Japan | 55/16 |
| 62-083022 | 4/1987 | Japan . | |

OTHER PUBLICATIONS

European Search Report for No. 88307702.6.

*Primary Examiner*—Robert Spitzer
*Attorney, Agent, or Firm*—Jones, Tullar & Cooper

[57] ABSTRACT

A process for separating a specific component from air which comprises alternately and repeatedly carrying out a step of feeding air under pressure to a non-porous gas separation membrane and suctioning of a permeating gas under vacuum after feeding of air is stopped.

4 Claims, 3 Drawing Sheets

PROCESS FOR SEPARATING GAS

This application is a continuation-in-part application of application Ser. No. 233,600 filed Aug. 18, 1988, now abandoned.

FIELD OF THE INVENTION

The present invention relates to a process for selectively enriching and separating a specific component from a mixed gas by using a gas separation membrane. More particularly, it relates to a process for enriching and separating a specific component efficiently and economically from air by applying a pressure swing adsorption technique to a non-porous gas separating membrane module.

BACKGROUND OF THE INVENTION

Various techniques for separating and refining a gas, or for enriching a specific component from a gas have been widely utilized in various fields such as industry, mining and medical treatment with regard to various gases. Among them, a technique for enriching and separating oxygen from air by using a separation membrane has already become practical in a medical apparatus for generating oxygen, and many apparatuses relating to this technique have been known. For example, there are Japanese Patent Kokai No. 58-55310 (apparatus for generating oxygen enriched air), Japanese Patent Kokai No. 59-82903 (apparatus for enriching oxygen), Japanese Patent Kokai No. 59-203705 (device for enriching oxygen), Japanese Patent Kokai No. 62-83022 (gas separation module), Japanese Patent Kokai No. 62-74433 (process for separating gas) and the like. Further, there are many inventions relating to separation membranes used in these apparatuses. For example, there are Japanese Patent Kokai No. 62-30524 (membrane for selective permeation), Japanese Patent Kokai No. 62-74405 (separation membrane) and the like. In general, as a material of a separation membrane, both organic and inorganic compounds have been proposed. In particular, recently, organic polymer compounds have been developed actively and many proposals have been made. Such a membrane is usually composed of a non-porous thin layer (5 to 50 $\mu$) on a porous support (50 to 500 $\mu$) according to various methods. In practice, these non-porous membranes are assembled in a suitable size. Usually, the resulting assembly is referred to as a "module". As a type of the module, plate-and-frame type, spiral type and hollow fiber type are mainly used and each type has respective characteristics. Therefore, they are used properly according to a particular purpose.

When various gases are enriched and separated by using the above module, in order to make such a separation process advantageous over other enrichment and separation processes, it is of importance to improve properties of the above various separation membranes, to improve separation efficiency by using a proper type of the module suitable for a particular use and increasing a packing density of the separation membranes per unit volume of the module, and further, to improve economical efficiency by extending the lifetime of the membrane. On the other hand, when the module is used, it is of importance to reduce running costs for separation. For this purpose, it is of importance to select suitable operating conditions of the module.

The separation operation using a non-porous membrane is carried out by flowing a raw material gas along one surface of the non-porous membrane, while keeping the pressure of the other side of the surface of the membrane lower than that of the raw material gas side. Thereby, a component in the raw material gas is dissolved and diffused in the membrane and is moved toward the lower pressure side. At this time permeability in a membrane varies depending upon a particular component of the gas and therefore the composition of a permeating gas is different from that of the raw material gas. Thus, the composition of the permeating gas is enriched in a certain component, on the other hand, the gas which is not permeated (non-permeating gas) is concentrated.

The running costs in this operation include power costs for heating or cooling the raw material gas and the permeating gas, life time of the module and, if necessary, costs for heating or cooling the raw material gas and the permeating gas, but mainly power costs. In order to reduce such running costs, the following various attempts have been made in the above prior art.

1. A part of the raw material gas is introduced into the permeating gas (Japanese Patent Kokai No. 62-74433).

2. The raw material gas is pressurized and, at the same time, the permeating gas is displaced by suction (Japanese Patent Kokai No. 58-55310).

3. Plural modules are connected in series to form multi-stage modules (Japanese Patent Kokai No. 58-55309).

4. In the above 3, modules are provided so that the area of each module becomes smaller gradually in the downstream direction (Japanese Patent Kokai No. 62-83022).

5. Pressure is kept constant by providing a control valve (Japanese Patent Kokai No. 59-203705).

Further, in order to improve the properties of the above various separation membranes, some proposals have been made. However, as the properties are improved, the costs of the separation membrane itself becomes higher. Therefore, an important factor which effects on the costs of a product as well as the above power costs is how to increase the yield of a product per unit area of the membrane.

In conventional gas separation techniques by using membranes including the techniques as described above, they are limited to feed a raw material gas steadily at a constant pressure from a raw material feeding side, or to evacuate under vacuum from a permeating side, or to carry out both operations simultaneously. In such a process, when the gas flows along the surface of the separation membrane, the more permeable component in the raw material gas is decreased as the surface is closer to the gas outlet and the partial pressure thereof is decreased, which results in insufficient permeation of the gas. Therefore, the desired properties of the separation membrane cannot be sufficiently exerted throughout the entire surface of the membrane, which results in a low product yield per unit area of the separation membrane.

OBJECTS OF THE INVENTION

The problem that a partial pressure of a more permeable component in a raw material gas, particularly air, becomes smaller at an outlet side and thereby gas separation efficiency, i.e., separation properties of a non-porous gas separation membrane is not sufficiently exerted has been studied. As a result it has been found that, if it is possible to make a pressure difference between a non-permeating side and a permeating side (a raw material feeding side and an evacuating side) larger and to make the partial pressure of the above-mentioned component throughout the entire surface of a non-porous membrane uniform, the above problem can be effectively solved.

Further, it has been found that the pressure difference between a feeding side and an evacuating side can be reached to the maximum at a low power cost by repeating an operation for feeding air into a non-porous gas separation membrane module and an operation for suction under vacuum alternately within a short period of time, and also found that this alternate repetition of the operations makes a partial pressure of the component more uniform throughout the entire surface of the membrane.

That is, the main object of the present invention is to provide an improved process for enriching and separating a specific component efficiently and economically from air by applying a pressure swing adsorption technique to a non-porous gas separating membrane module.

This object as well as other objects and advantages of the present invention will become apparent to those skilled in the art from the following description with reference to the attached drawings.

SUMMARY OF THE INVENTION

According to the present invention, there is provided a novel process for enriching and separating a specific component from air by feeding air to a non-porous gas separation membrane module. The process for separating a gas of the present invention comprises alternately and repeatedly carrying out a step for feeding air under pressure to a non-porous gas separation membrane and a step of drawing a permeating gas under vacuum after feeding of air is stopped.

DETAILED DESCRIPTION OF THE INVENTION

Figure 1:
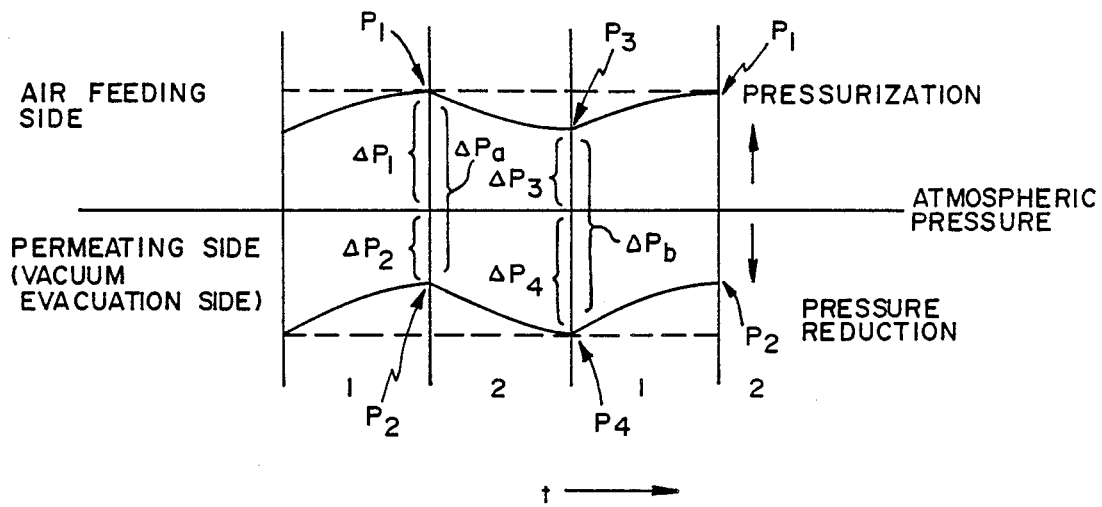
FIG. 1 is a pressure pattern illustrating the function and mechanism of the process of the present invention.

In the process of the present invention, a partial pressure of a more permeable component in air becomes more uniform throughout the entire surface of the non-porous membrane by feeding a raw material gas (air) to a module intermittently in comparison with feeding air continuously or carrying out suction under vacuum continuously under a constant pressure difference Thereby, decrease in an amount of a permeating gas and lowering of separation efficiency at a part close to a gas outlet side can be prevented and the entire area of a membrane can be effectively utilized. Further, when feed of air and suction under vacuum from a permeating side are repeatedly and alternately carried out at a time cycle of 2 seconds to 5 minutes, a residual pressure is generated at both feeding and evacuating sides, respectively. These residual pressures provide a larger pressure difference between a feeding side and an evacuating side in comparison with that provided by carrying out pressurization and/or evacuation continuously under a constant pressure difference. Thus, it is considered that this large pressure difference must provide advantages of the present invention Although the function and mechanism of the present invention are not sufficiently clear, they can be illustrated, for example, by using FIG. 1. In FIG. 1, "t", represents an operation time. With the elapse of "t", at the feeding side, a raw material gas (air) is pressurized to $P_1$ and then the pressure is reduced to $P_3$ by evacuation at a permeating side. On the other hand, the permeating side is evacuated to $P_4$ and then pressurized to $P_2$ by the next pressurization. In the present invention, the pressure difference $\Delta Pa$ ($=\Delta P_1+\Delta P_2$) or $\Delta Pb$ ($=\Delta P_3+\Delta P_4$) is generated between the feeding side and the permeating side by alternately carrying out feeding of air under pressure and carrying out evacuation of the permeating gas under vacuum. Thereby, the residual pressure corresponding to $\Delta P_2$ or $\Delta P_3$ is added to $\Delta P_1$ or $\Delta P_4$ in comparison with a conventional process wherein the raw material gas is fed at a constant pressure ($P_1$) or constant evacuation ($P_4$) is carried out under vacuum. Further, even if the pressure difference ($\Delta Pa$ or $\Delta Pb$) is the same as that generated in a conventional constant pressurization or constant evacuation process, in the present invention, the pressure at each side periodically varies between $P_1$ and $P_3$ or $P_2$ and $P_4$ because of alternate repetition of pressurization and evacuation. Furthermore, the pressure ratios $P_1/P_2$ and $P_3/P_4$ between $\Delta Pa$ to $\Delta Pb$ vary. In view of the above, it is considered that a driving force is applied to permeability of the separation membrane to attain the desired advantages of the present invention.

Thus, it is surprising that, as seen from the Examples as shown hereinafter, the process of the present invention has extremely superior advantages over a conventional process wherein constant pressurization and/or constant suction under vacuum are carried out.

In the present invention, it is preferred that the above pressurization and suction steps are repeatedly carried out at a short cycle time of 2 seconds to 5 minutes, more preferably about 5 to 20 seconds. When the cycle time is too long or short, the advantages of the present invention can not be sufficiently exerted. One pump may be used in common for both pressurization and pressure reduction by switching, or different pumps may be used for pressurization and suction, respectively. In the case of a large industrial scale apparatus, pressurization or suction would be carried out by using different pumps rather than using one pump because a pump which is suitable for use in common for pressurization and suction can hardly be available in an industrial scale. Furthermore, by using different pumps, there is obtained an additional advantage that plural modules can be readily operated simultaneously and therefore a product can be continuously obtained.

The gas separation process of the present invention can be applied to any type of module including plate-and-frame type, spiral type, hollow fiber type and the like.

PREFERRED EMBODIMENT OF THE INVENTION

A preferred embodiment of the process of the present invention is illustrated hereinafter by, for example, separation of oxygen from air using a hollow fiber type module which is a most popular type nowadays.

Figure 2:
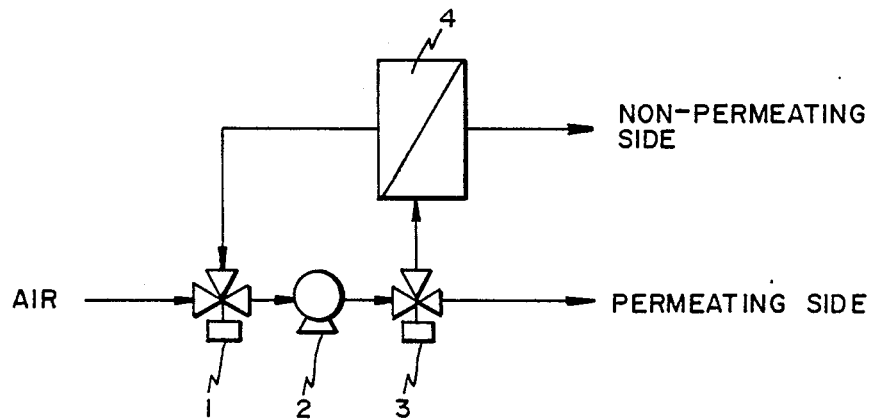
FIG. 2 illustrates a preferred example of an apparatus, showing flow directions, used in the present invention, wherein pressurization and pressure reduction are repeatedly carried out by using one pump.

FIG. 2 illustrates one preferred example of an apparatus used in the present invention and the direction of flow, wherein pressurization and pressure reduction are repeatedly carried out by using one pump 2 through valves 1 and 3. In FIG. 2, the permeating side of an oxygen permeation non-porous membrane module 4 is evacuated by suction under vacuum. As a matter of course, this process can be carried out using one pump 2, even if plural non-porous gas separation membrane modules are used. When oxygen is to be separated, the desired product is obtained at the permeating side and the permeating side is evacuated by suction under vacuum. To the contrary, when nitrogen is to be enriched and separated, the non-permeating side is exhausted and the desired product is stored in a tank. These operations can be appropriately chosen according to the properties of the non-porous separation membrane to be used and both operations are included in the scope of the present invention in so far as suction is carried out under vacuum at the permeating side thereof.

Of course, even if plural separation membrane modules are used, the operations can be carried out with one pump. Apparently, this is very advantageous to a conventional process wherein the constant pressurization and evacuation are carried out with two pumps.

Figure 3A:
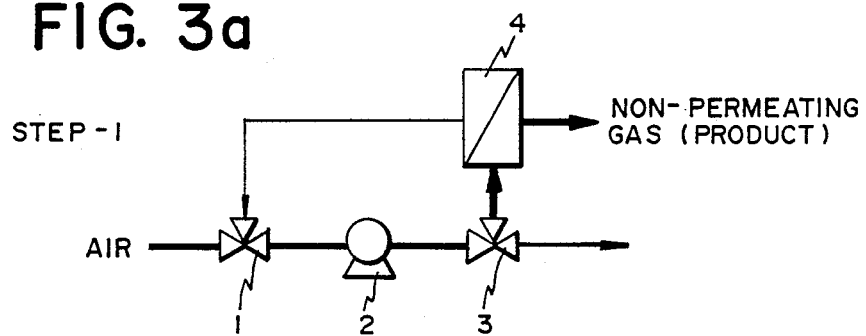
FIGS. 3a and 3b are gas flow patterns illustrating one preferred embodiment of the process of the present invention, wherein the apparatus as shown in FIG. 2 is used.
Figure 3B:
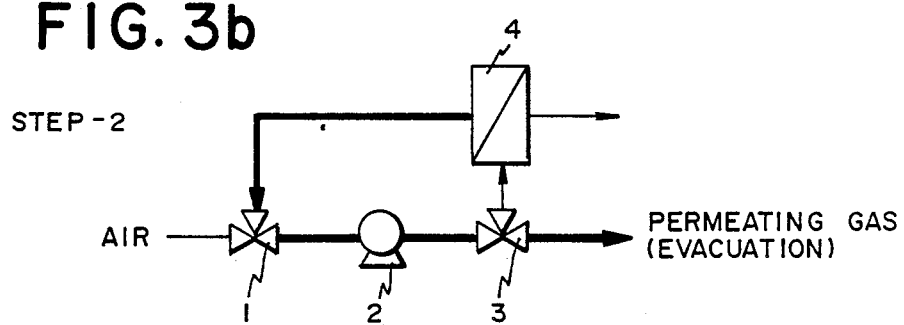

FIGS. 3a and 3b are gas flow patterns illustrating one preferred embodiment of the process of the present invention, wherein the apparatus shown in FIG. 2 is used. In Step-1, nitrogen is separated from the non-permeating side by feeding the raw material air under pressure to the non-porous gas separation membrane 4 and, in Step-2, after stopping feed of the raw material air, evacuation is carried out by suction under vacuum at the permeating side of the gas separation membrane module 4. As described above, this process corresponds to separation of nitrogen from air as the raw material gas. To the contrary, when oxygen is desired as the product, the suction gas at the permeating side must be collected. The optimal values of the cycle time of Step-1 and Step-2 and the pressure for the pressurization and pressure reduction should be experimentally determined according to the particular kind of gas, properties of the separation membrane, the kind of module, the structure of the apparatus and the like.

Figure 4:
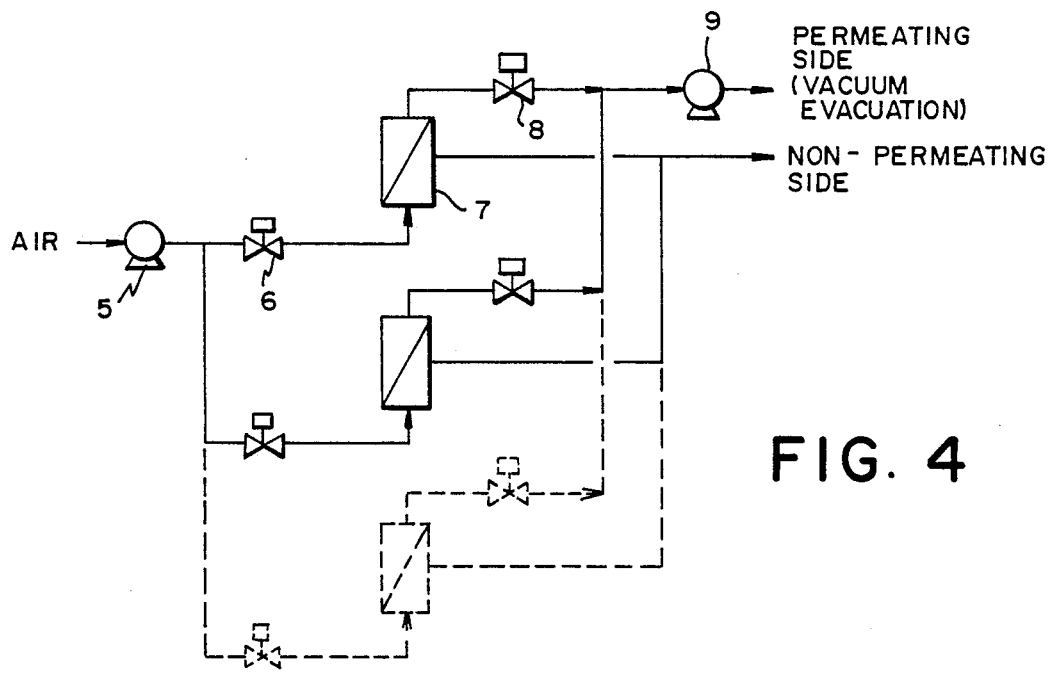
FIG. 4 illustrates another preferred example of an apparatus used in the present invention, wherein pressurization and vacuum evacuation are repeatedly carried out using different pumps.

Likewise, FIG. 4 illustrates another preferred example of an apparatus of the present invention and the direction of flow, wherein an air feeding pump 5 for pressurization and a vacuum pump 9 for pressure reduction are provided to a non-porous gas separation membrane module 7 through valves 6 and 8, respectively.

Figure 5A:
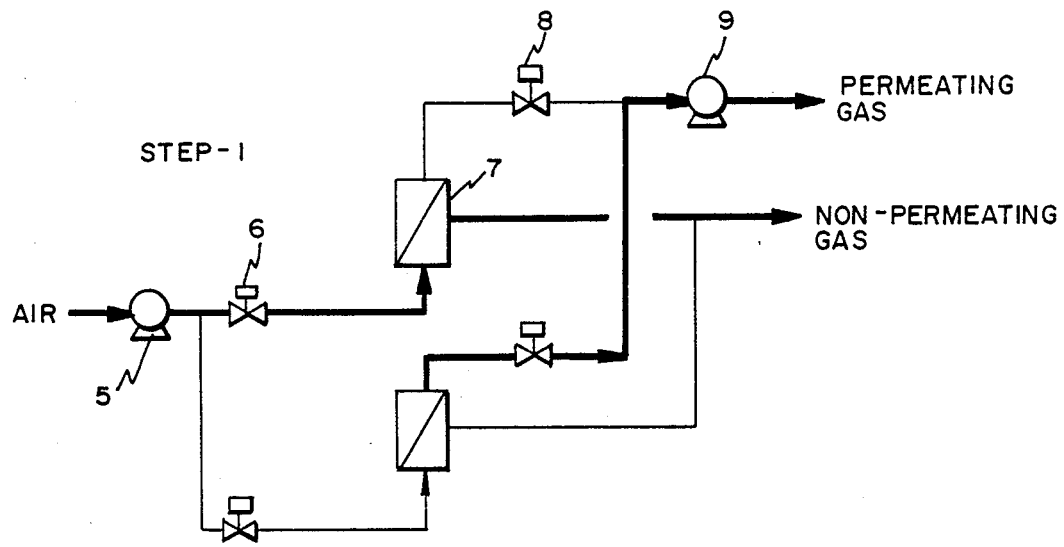
FIGS. 5a and 5b are gas flow patterns illustrating another preferred embodiment of the process of the present invention, wherein the apparatus as shown in FIG. 4 is used.
Figure 5B:
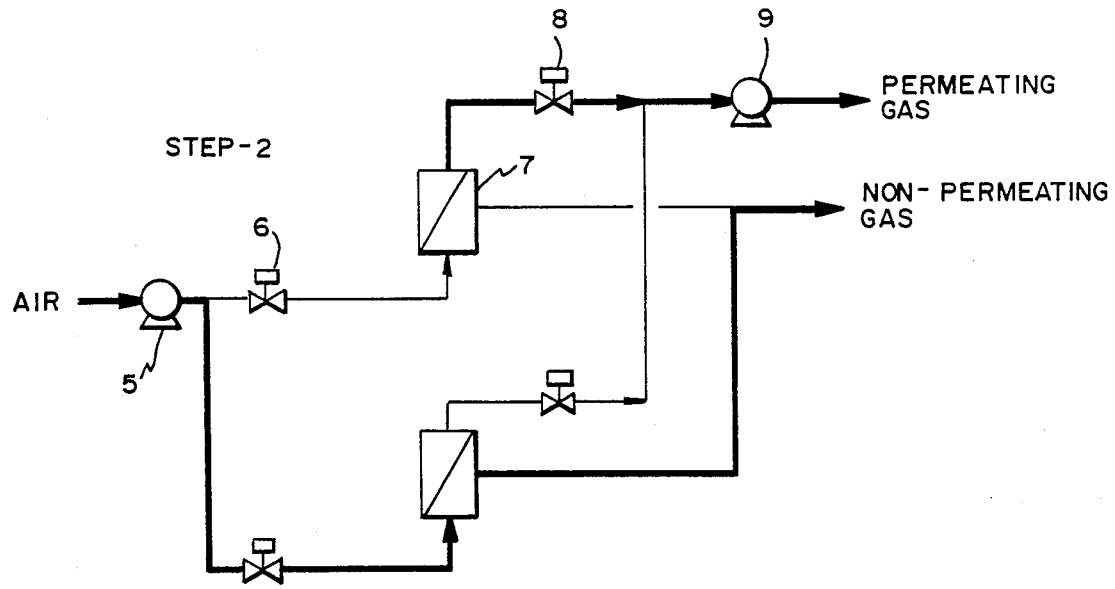

FIGS. 5a and 5b are gas flow patterns illustrating another preferred embodiment of the process of the present invention, wherein the apparatus shown in FIG. 4 is used. As described above with respect to FIG. 3, the optimal values of the cycle time and the like should be experimentally determined, but a short cycle time of 2 seconds to 5 minutes is effective in any case.

In a conventional gas enriching and separation process, constant pressurization and/or pressure reduction are steadily effected to enrich and to separate a product from a raw material gas with a separation membrane module. On the other hand, in the present invention, pressurization and pressure reduction are alternately and repeatedly carried out. Thereby, properties of a gas separation membrane can be sufficiently exerted so that a product having high concentration which can not have ever been obtained can be obtained. Further, regarding a product having the same concentration as that obtained according to a conventional process, the yield per unit time of a product in the present invention is about twice as much as that in a conventional process.

The following Examples further illustrate the present invention in detail, but are not to be construed to limit the scope thereof.

EXAMPLE 1 AND COMPARATIVE EXAMPLE 1

Production of nitrogen enriched gas

According to the process as shown in FIGS. 3a and 3b, by using a hollow fiber type non-porous gas separation membrane module of cellulose acetate resin having 8 $m^2$ of membrane surface area and one diaphragm type pump (capacity: 50 l/min, 180 W) and feeding air, pressurization and pressure reduction were alternately repeated at a cycle time of 10 seconds in Step-1 and Step-2, respectively and then oxygen was evacuated from the permeating side to obtain nitrogen enriched product gas from the non-permeating side.

The results and those of Comparative Example 1 wherein air was fed at a constant pressure by using the same pump are shown in Table. 1.

TABLE 1

|  | Feeding pressure of air (kg/$cm^2$ G) | Degree of pressure reduction (torr) | Oxygen concentration of product (%) | Amount of nitrogen enriched gas (l/min) | Pressure of product (kg/$cm^2$ G) |
| --- | --- | --- | --- | --- | --- |
| Example 1-1 | 2-3 | 200 | 7.5 | 2.2 | 2 |
| Comp. Example 1-1 | 3.5 | atmospheric pressure | 7.5 | 1.5 | 3.5 |
| Example 1-2 | 2-3 | 200 | 5.0 | 1.25 | 2 |
| Comp. Example 1-2 | 3.5 | atmospheric pressure | 5.0 | 0.75 | 3.5 |

As is clear from Table 1, in the case where the oxygen concentration of the product is 5%, the amount of the resulting nitrogen product gas of Example 1 is 1.7 times as much as that obtained by Comparative Example 1 wherein air is fed at a constant pressure by using the same pump and the same module as those in Example 1.

EXAMPLE 2 and COMPARATIVE EXAMPLE 2

Production of nitrogen enriched gas

According to the same manner as described in Example 1, nitrogen enriched product was obtained except that the same two gas separation membrane modules and the same two pumps for pressurization and for pressure reduction were used (see FIGS. 5a and 5b).

Apparently, both oxygen concentration and yield of the present invention are superior to those of the conventional process.

TABLE 3

|  | Feeding pressure of air (kg/cm$^2$ G) | Degree of pressure reduction (torr) | Oxygen concentration of product (%) | Amount of oxygen enriched gas (l/min) | Pressure of porduct |
|---|---|---|---|---|---|
| Example 3 | 2–3 | 200 | 29 | 6.7 | atmospheric pressure |
| Comp. Example 3 | 3.0 | 260 | 25 | 6.0 | atmospheric pressure |

The results are shown in Table 2. In Table 2, the results of Comparative Example 2 wherein air is fed at a constant pressure and evacuated at a constant pressure in vacuo by using two pumps are also disclosed. Regarding a product having the same concentration as that obtained according to a conventional process, the yield per unit time of a product in the present invention is 1.5 times as much as that in a conventional process.

TABLE 2

|  | Feeding pressure of air (kg/cm$^2$ G) | Degree of pressure reduction (torr) | Oxygen concentration of product (%) | Amount of nitrogen enriched gas (l/min) | Pressure of product (kg/cm$^2$ G) |
|---|---|---|---|---|---|
| Example 2-1 | 2.0–3.0 | 200 | 7.5 | 4.8 | 2.0 |
| Comp. Example 2-1 | 3.0 | 260 | 7.5 | 3.2 | 3.0 |
| Example 2-2 | 2.0–3.0 | 200 | 5.0 | 2.6 | 2.0 |
| Comp. Example 2-2 | 3.0 | 260 | 5.0 | 1.8 | 3.0 |

EXAMPLE 3 AND COMPARATIVE EXAMPLE 3

According to the same manner as described in Example 2, an oxygen enriched gas was obtained as a product gas execpt that the permeating gas was sucked and collected. The results are shown in Table 3. Comparative Example 3 was carried out according to a conventional process wherein constant pressurization and constant evacuation were effected simultaneously.

What is claimed is:

1. A process for separating a specific component from air by feeding air to a gas separation membrane module, which comprises the steps of: alternately and repeatedly feeding air under pressure to a non-porous gas separation membrane of a module selected from the group consisting of a plate-and-frame module, a spiral module and a hollow fiber module; and suctioning of a permeating gas under vacuum after feeding of air is stopped.

2. The process according to claim 1, wherein each step is repeatedly carried out at a cycle time of 2 seconds to 5 minutes.

3. The process according to claim 1, wherein one pump is commonly used for pressurization and pressure reduction.

4. The process according to claim 1, wherein different pumps are used for pressurization and pressure reduction, respectively.

* * * * *